(12) United States Patent
Bajar

(10) Patent No.: US 11,070,503 B2
(45) Date of Patent: Jul. 20, 2021

(54) METHOD AND SYSTEM FOR CREATING A PERSONALIZED E-MAIL

(71) Applicant: Rahmi Bajar, Zurich (CH)

(72) Inventor: Rahmi Bajar, Zurich (CH)

( * ) Notice: Subject to any disclaimer, the term of this patent is extended or adjusted under 35 U.S.C. 154(b) by 0 days.

(21) Appl. No.: 16/735,906

(22) Filed: Jan. 7, 2020

(65) Prior Publication Data

US 2020/0228481 A1 Jul. 16, 2020

(30) Foreign Application Priority Data

Jan. 14, 2019 (DE) .......................... 102019100767.4

(51) Int. Cl.
*G06F 15/16* (2006.01)
*H04L 12/58* (2006.01)

(52) U.S. Cl.
CPC .................................. *H04L 51/10* (2013.01)

(58) Field of Classification Search
USPC ......................................................... 709/206
See application file for complete search history.

(56) References Cited

U.S. PATENT DOCUMENTS

| | | | | |
|---|---|---|---|---|
| 5,539,453 A * | 7/1996 | David | .................... | G03B 17/53 348/158 |
| 6,018,774 A * | 1/2000 | Mayle | .................. | G06Q 10/107 709/250 |
| 6,252,588 B1 | 6/2001 | Dawson | | |
| 8,341,396 B1 * | 12/2012 | Nick-Baustert | ....... | H04L 51/063 713/153 |
| 9,400,974 B2 * | 7/2016 | O'Mara | ................ | G06F 40/169 |
| 10,467,327 B1 * | 11/2019 | Arazi | ..................... | G06Q 50/01 |
| 2002/0059447 A1 * | 5/2002 | Nguyen | ................ | G06F 40/103 709/238 |
| 2003/0163819 A1 * | 8/2003 | Lee | ................... | H04N 21/47205 725/61 |
| 2003/0172116 A1 * | 9/2003 | Curry | ................... | G06Q 10/107 709/206 |
| 2006/0224680 A1 * | 10/2006 | Terayoko | .............. | H04L 51/063 709/206 |
| 2007/0244977 A1 * | 10/2007 | Atkins | .................. | H04L 51/063 709/206 |
| 2008/0162649 A1 * | 7/2008 | Lee | ......................... | H04L 51/32 709/206 |
| 2009/0017870 A1 * | 1/2009 | An | ..................... | H04M 1/72457 455/565 |
| 2009/0049070 A1 * | 2/2009 | Steinberg | .............. | G06F 16/958 |
| 2009/0292776 A1 * | 11/2009 | Nesbitt | ................ | G06Q 10/107 709/206 |
| 2011/0106896 A1 * | 5/2011 | Baransky | ................ | H04L 67/18 709/206 |
| 2011/0145101 A1 * | 6/2011 | Berger | ............... | G06Q 30/0631 705/27.1 |

(Continued)

FOREIGN PATENT DOCUMENTS

EP 1096723 A2 5/2001
EP 1732286 A2 12/2006

*Primary Examiner* — Anthony Mejia
(74) *Attorney, Agent, or Firm* — Richard M. Goldberg

(57) ABSTRACT

A method for creating a personalized E-Mail within a mail client, includes the creation of a signature as a part of the E-mail based on the interaction of a user with the mail client, a portrait image of the user being automatically integrated into the signature.

5 Claims, 1 Drawing Sheet

(56) References Cited

U.S. PATENT DOCUMENTS

| | | | |
|---|---|---|---|
| 2012/0150978 A1* | 6/2012 | Monaco | G06Q 10/107 709/206 |
| 2013/0262528 A1* | 10/2013 | Foit | G06Q 30/06 707/805 |
| 2015/0040031 A1* | 2/2015 | Lee | G06F 3/04842 715/748 |
| 2015/0332088 A1* | 11/2015 | Chembula | G06K 9/468 382/203 |
| 2016/0197837 A1* | 7/2016 | Fullerton | H04L 65/602 370/238 |
| 2016/0239658 A1* | 8/2016 | Loughlin-McHugh | G06F 21/45 |
| 2016/0241531 A1* | 8/2016 | Loughlin-McHugh | H04L 63/102 |
| 2016/0364698 A1* | 12/2016 | Bouz | G06Q 10/1095 |
| 2017/0201473 A1* | 7/2017 | Stanek | H04L 67/10 |
| 2018/0115503 A1* | 4/2018 | Baldwin | H04W 4/80 |
| 2018/0213056 A1* | 7/2018 | Chau | H04L 51/04 |
| 2018/0336320 A1* | 11/2018 | Le Henaff | G06K 9/4671 |
| 2019/0272083 A1* | 9/2019 | Grandpre | H04L 51/10 |
| 2020/0258176 A1* | 8/2020 | Gibson | H04L 9/3239 |

\* cited by examiner

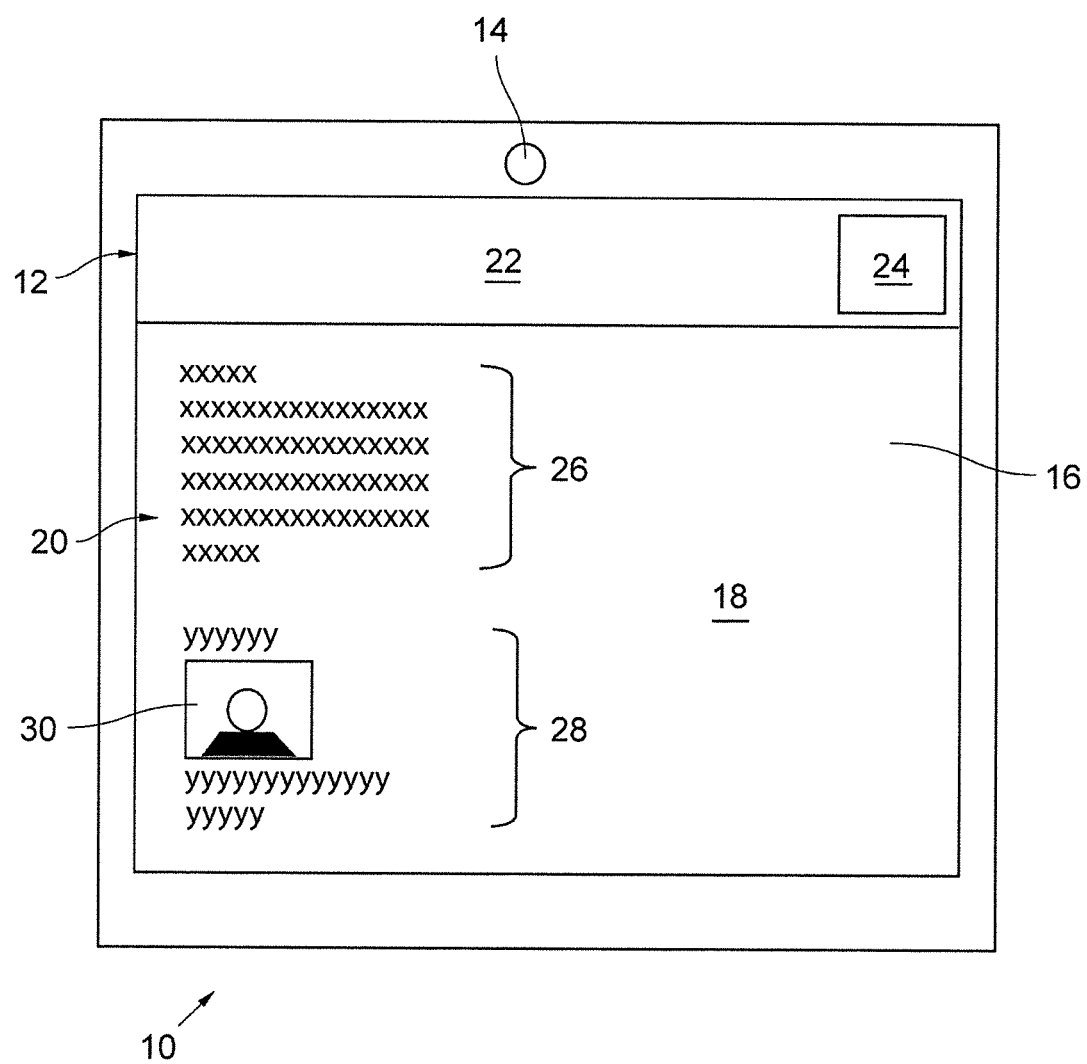

METHOD AND SYSTEM FOR CREATING A PERSONALIZED E-MAIL

BACKGROUND OF THE INVENTION

The present invention relates to a method for creating a personalized E-mail, a data processing program, a computer-readable medium and an appropriate system.

It is well known that a signature may be created to personalize an E-Mail. The usual E-Mail clients, that is, the software programs for creating and managing E-Mails, have a function, by means of which the user (that is, the sender) can automatically generate a pre-stored signature as part of an E-Mail written by the user. Since the signature is stored, it does not have to be written again every time. Usually, the signature comprises a text block and/or an image file.

It is desirable that E-Mails be as informative for the sender as possible and customary, particularly in the commercial area, to add current content, such as references to the company profile and current products and the like to the signature. However, it is desirable to create the possibility of personalizing an E-Mail even further with the objective of being able to address the recipient in a more personal way.

SUMMARY OF THE INVENTION

This object is accomplished inventively by the method having the features of the claims.

In accordance with the invention, at least one portrait image of the user is included automatically in the signature of the E-Mail. This means that, in addition to the strictly informative content of usual signatures, for example, as well as information about the sender in text form, further personal information is transmitted, which makes the contact more appealing visually. A portrait image forms an interesting possibility for doing this. Such a personalization is particularly meaningful in the commercial area, for example, when a company has a large number of employees, who are constantly changing contact with customers, which makes customer loyalty more difficult.

The portrait image can be produced in various ways or originate from different sources, as is evident, for instance, from the examples shown here.

In accordance with a preferred embodiment of the present invention, the portrait image is recorded by a camera. This camera may be integrated, for example, in hardware, such as a personal computer (PC), with which the mail client is operated. However, the portrait image may also be downloaded from an external source.

Preferably, the portrait image is stored in a memory and is retrieved from the memory by interaction with the user. This means that the interaction with the user, by means of which the signature is created automatically, also causes the portrait image to be retrieved from the memory. For example, the user makes an input, for example, by clicking a mouse on an icon, by means of which the signature is created, which is already contained in the portrait picture. For this purpose, the portrait image may be linked to a user profile, which is assigned to the user by an operating system, on which the mail client is executed.

In accordance with a further preferred embodiment of the present invention, the portrait image is recorded with a camera as a result of the interaction of the user, in order to create the signature. This means that the portrait image can be taken directly in real time or simultaneously with it as a result of the interaction of the user, to create the signature. In this case, the portrait image does not have to be stored at a prior time and instead is generated anew each time the signature is created. This can also be used as a security feature, by means of which the sender of the E-Mail is verified. If the camera is installed in such a way that the user is in its visual field during the interaction with the mail client, the creation of the camera image and the registration of the interaction are linked with one another. It is very difficult to circumvent such a security feature.

Furthermore preferably, the interaction with the user to create the signature and to take the portrait image also triggers the sending of the E-Mail. By these means, the possibilities of the user to manipulate the E-Mail client are limited further.

Preferably, the portrait image is a static image.

In accordance with a further embodiment of the invention, the portrait image comprises a video sequence, that is, a sequence of images or a moving image.

The present invention furthermore relates to a data processing program, comprising a programming code for carrying out the inventive method, as described above. The data processing program may contain commands, which can be executed by a computer and which, when executed by a computer, cause the computer to carry out the inventive method.

Furthermore, the present invention relates to a computer-readable medium, on which such a data processing program is stored.

The present invention furthermore relates to a system for creating a personalized E-Mail, comprising a computer-readable medium, as mentioned above, a camera and an input device for inputting instructions by a user.

BRIEF DESCRIPTION OF THE DRAWINGS

In the following, a preferred example of the present invention is explained in greater detail with the aid of the drawing.

The single FIGURE shows a diagrammatic view of a computer screen, comprising the representation of an E-Mail client including an E-Mail.

DETAILED DESCRIPTION

The computer screen 10 shown is a component of a system such as a personalized E-Mail. Further components of the system, particularly hardware components for making entries in the system for operating the computer screen 10 and the like, are not shown here for the sake of simplicity. The system may, in particular, comprise a personal computer (PC) with the usual components. Accordingly, the computer screen 10 can be connected to such a PC, on which an operating system is running, which in turn can execute a mail client. The mail client is a data processing program, which is suitable and set up for creating, sending, receiving, reading and managing E-Mails.

The computer screen 10 contains a display 12 and a camera 14, which is integrated above the display 12 in the frame of the computer screen 10. The visual field of the camera 14 is set up in such a way that a user, located in front of the computer screen 10, is recorded by the camera 14.

A user interface 16 of the mail client is shown in the display 12. It comprises a lower area 18, in which an E-Mail 20 is shown, and a bar 22, which is disposed above the lower area 18 with icons as input fields. For the sake of simplicity, only one icon 24 is shown, but it goes without saying that a large number of icons may be present in the usual way for various inputs and to initiate an appropriate interaction between the user and the E-Mail client. The inputs are made by clicking on the appropriate icons 24. This technology is well known in graphical user interfaces and will therefore not be described further.

The E-Mail 20 comprises a text body 26 and a signature 28 below the text body 26. Usually, the text body 26 is composed using a keyboard, whereas the signature 28 is pre-stored according to the prior art and generated on the basis of an interaction of the user with the E-Mail client. This interaction, may be achieved, for example, by clicking the icon 24. The signature 28 may comprise lines of text as well as files.

In accordance with the invention, the signature 28 comprises at least one portrait image 30 of the user. This portrait image 30 is recorded by the camera 14. In accordance with one embodiment of the present invention, the portrait image 30 is recorded, stored in a memory and integrated at a later time when the signature 28 is being created.

In accordance with a further embodiment of the invention, the portrait image 30 is recorded by the camera 14 by the interaction of the user, that is, by clicking on the icon 24. For this embodiment, the signature is thus generated with a portrait image 30 produced in real time by the camera 14. As a result, the E-Mail is personalized but, in addition, the sender is also verified, since a user, who can operate the icon 24, is also automatically recorded by the camera 14. This creates a security feature, which is very difficult to evade.

The at least one portrait image 30 may inventively be a still image, which is a portrait photograph of the user, or also a plurality of images, a moving image or an image sequence, that is, a video sequence. The still image may, for example, be in a JPEG format or in another suitable format. Appropriate video image formats, which are suitable for the present purpose, such as MP4, are also known.

Within the scope of the present invention, it is also possible for the interaction of the user to create the signature and to take the at least one portrait image 30, that is to say in the present example, to click on the icon 24 and also, simultaneously, to initiate the sending of the E-Mail, which includes the signature 28 with the portrait image 30. No intermediate steps between the creation of the signature 28, including the creation of the portrait image 30 and the sending, that is, processing of the e-mail 20 are possible. A further safety feature is created by these means.

The present invention also comprises a data processing program, that is, for example, an appropriate software product, which includes an E-Mail client. Furthermore, the invention relates to a computer-readable medium, on which an appropriate data processing program is stored. The data processing program comprises commands which, when executed on a computer, cause this computer to carry out the inventive method, that is, in particular, to display the E-Mail client with the user interface 16, comprising the icon 24 and further components, which are necessary for the interaction between the user and the E-Mail client.

In addition, the present invention includes a system for creating a personalized E-Mail, comprising such a computer-readable medium, the camera 14 and an input device for inputting instructions by a user. This input device may be a mouse, for example, by means of which a cursor may be moved on the user interface 16 to click on the icon 24.

The verification of the user by creating at least one portrait image 30 of the user and incorporating this portrait image 30 into a signature 28 of an E-Mail 20 enables the use in various commercial processes, for example, in online trading, to verify a buyer, who sends the order of the E-Mail 20 or also to interact in so-called online banking, where it is important that the sender of an E-Mail 20 is verified securely. Pursuant to the invention, the verification is therefore carried out by creating a portrait image 30 of the user, which is integrated automatically into the signature 28 of the mail 20, and, if appropriate, also automatically sending the mail 20 when the signature 28 including the recorded portrait picture 30 is created.

What is claimed is:

1. A method for creating a personalized E-mail within a mail client, comprising the steps of:
   creating a signature as part of the E-mail on the basis of interaction between a user and the mail client, and
   simultaneously in real time performing the following steps:
      obtaining a portrait image of the user by a camera directly in real time as a result of the interaction with the user to create the signature,
      automatically including the obtained portrait image of the user in the signature at the time of obtaining the portrait image, and
      triggering the sending of the E-mail simultaneously in response to interaction of the user to create the signature and to obtain the portrait image.

2. The method of claim 1, wherein the portrait image is a still image.

3. The method of claim 1, wherein the portrait image is a dynamic image that comprises a video sequence.

4. A non-transitory computer-readable medium, on which a data processing program comprising program code for carrying out the method of claim 1 is stored.

5. A system for creating a personalized E-mail, comprising:
   a computer-readable medium of claim 4,
   a camera and
   an input device for inputting instructions by the user,
   wherein the visual field of the camera is set up in such a way that the user is recorded by the camera during the user inputs instructions into the input device.

* * * * *